(12) United States Patent
Matsumoto et al.

(10) Patent No.: US 6,416,826 B1
(45) Date of Patent: Jul. 9, 2002

(54) LIQUID CRYSTAL DISPLAY ELEMENT

(75) Inventors: Mitsuyo Matsumoto, Osaka; Tsuyoshi Nozaki, Tsuchiura; Hideaki Ueda, Kishiwada, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/371,413

(22) Filed: Aug. 10, 1999

Related U.S. Application Data
(60) Provisional application No. 60/126,093, filed on Mar. 25, 1999.

(30) Foreign Application Priority Data

Aug. 18, 1998  (JP) ............................................ 10-231922

(51) Int. Cl.$^7$ ......................... C09K 19/34; C09K 19/12
(52) U.S. Cl. ............... 428/1.1; 252/299.61; 252/299.66
(58) Field of Search ..................... 252/299.61, 299.63, 252/299.66, 299.67; 428/1.1

(56) References Cited

U.S. PATENT DOCUMENTS

| | | | | |
|---|---|---|---|---|
| 5,384,071 A | * | 1/1995 | Gray et al. ............. | 252/299.63 |
| 5,395,552 A | * | 3/1995 | Suenaga eet al. ...... | 252/299.61 |
| 5,437,815 A | | 8/1995 | Yamada et al. ........ | 252/299.66 |
| 5,439,613 A | * | 8/1995 | Takeshita et al. ...... | 252/299.63 |
| 5,560,865 A | * | 10/1996 | Nakagawa et al. .... | 252/299.01 |
| 5,582,767 A | * | 12/1996 | Buchecker et al. .... | 252/299.66 |
| 5,683,624 A | * | 11/1997 | Sekiguchi et al. ..... | 252/299.61 |
| 5,792,387 A | * | 8/1998 | Hachiya et al. ......... | 252/299.6 |
| 5,858,271 A | * | 1/1999 | Sekiguchi et al. ..... | 252/299.01 |
| 5,955,000 A | * | 9/1999 | Carrick et al. ......... | 252/299.65 |
| 5,972,240 A | | 10/1999 | Kobayashi et al. .... | 252/299.01 |
| 6,015,507 A | * | 1/2000 | Kobayashi et al. .... | 252/299.01 |

\* cited by examiner

*Primary Examiner*—Shean C. Wu
(74) *Attorney, Agent, or Firm*—Sidley Austin Brown & Wood LLP

(57) ABSTRACT

A liquid crystal display element includes a cholesteric phase liquid crystal component and a space holding member held within a pair of substrates, wherein at least one of which is transparent. The liquid crystal component is a chiral-nematic liquid crystal material containing a liquid crystal pyrimidine compound having fluorine in the molecule, liquid crystal diphenylacetylene having fluorine in the molecule, and a chiral component. The liquid crystal component may also contain a liquid crystal phenylcyclohexane compound, a liquid crystal cyanobiphenyl compound, and a liquid crystal alkenyl compound. In the present invention, characteristics such as color purity and reflectivity are improved, contrast is increased, and the drive voltage can be reduced by including in the nematic liquid crystal component a liquid crystal pyrimidine compound having fluorine within the molecule, and a liquid crystal diphenylacetylene compound containing fluorine within the molecule.

15 Claims, 2 Drawing Sheets

LIQUID CRYSTAL DISPLAY ELEMENT

CROSS REFERENCE TO RELATED APPLICATIONS

This application claims the benefit of U.S. Provisional Application No. 60/126,093, filed Mar. 25, 1999. Further, this application is based on Japanese Patent Application No. HEI 10-231922, filed Aug. 18, 1998, the contents of which is hereby incorporated by reference.

FIELD OF THE INVENTION

The present invention relates to a liquid crystal display element, and in one aspect relates to a twin stable-reflective liquid crystal display element that manifests a cholesteric phase at room temperature.

BACKGROUND OF THE INVENTION

Various research has been conducted in recent years on reflective type liquid crystal display elements using chiral nematic liquid crystal materials, which manifest a cholesteric phase at room temperature by adding a chiral component to a nematic crystal. This type of element displays an image by switching between a planar state and a focal-conic state according to the application of high and low pulse voltages. Upon the application of a voltage, the liquid crystal material attains a homeotropic state. When the voltage is removed, the material then attains either a planar state or focal-conic state depending upon the level of voltage previously applied to the liquid crystal material. The planar and focal-conic conditions are maintained after the application of a pulse voltage (known as twin stability and memory), and the display is maintained after the voltage is removed.

Until now reflective type liquid crystal display elements have used chiral nematic liquid crystal materials, which have low reflectivity and cannot produce adequate contrast in the planar state and focal conic state, and which do not have adequate characteristics, such as color purity (excitation purity). It is important to set the drive voltage as low as possible in this type of liquid crystal element.

SUMMARY OF THE INVENTION

An object of the present invention is to provide a reflective type liquid crystal display element which has excellent twin stability and high contrast with superior characteristics such as color purity and reflectivity, and which can be set to a low drive voltage.

These objects are attained by the present invention by providing a liquid crystal display element comprising a cholesteric phase liquid crystal component and a space holding member held within a pair of substrates, wherein at least one of which is transparent. The liquid crystal component is a chiral-nematic liquid crystal material containing a liquid crystal pyrimidine compound having fluorine in the molecule, liquid crystal diphenylacetylene compound having fluorine in the molecule, and a chiral component. The liquid crystal component may also contain a liquid crystal phenylcyclohexane compound, a liquid crystal cyanobiphenyl compound, and a liquid crystal alkenyl compound.

In the present invention, characteristics such as color purity and reflectivity are improved, contrast is increased, and the drive voltage can be reduced by including in the nematic liquid crystal component a liquid crystal pyrimidine compound having fluorine within the molecule, and a liquid crystal diphenylacetylene compound containing fluorine within the molecule.

DESCRIPTION OF THE PREFERRED EMBODIMENT

The preferred embodiments of the liquid crystal display element of the present invention are described hereinafter with reference to the accompanying drawings.

Figure 1A:
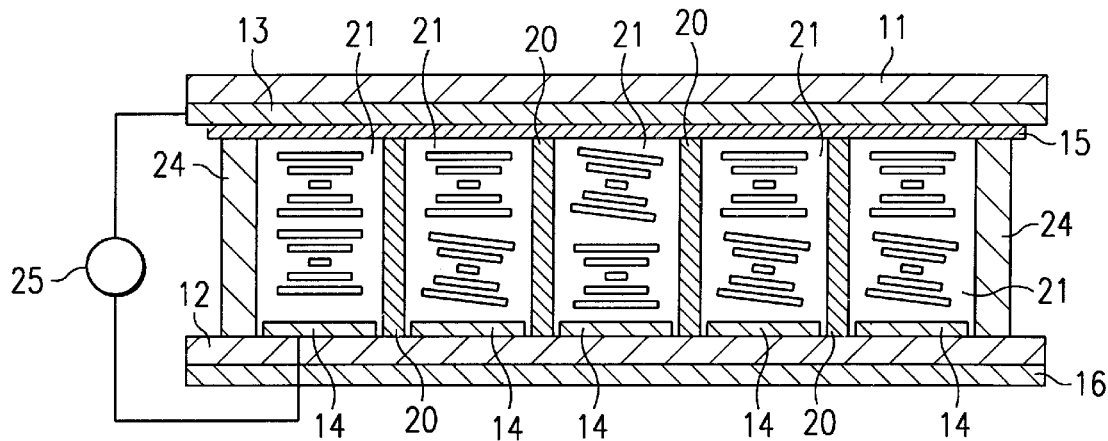
FIG. 1A is a cross-sectional view of a first embodiment of the liquid crystal display element of the present invention in the planar state.
Figure 1B:
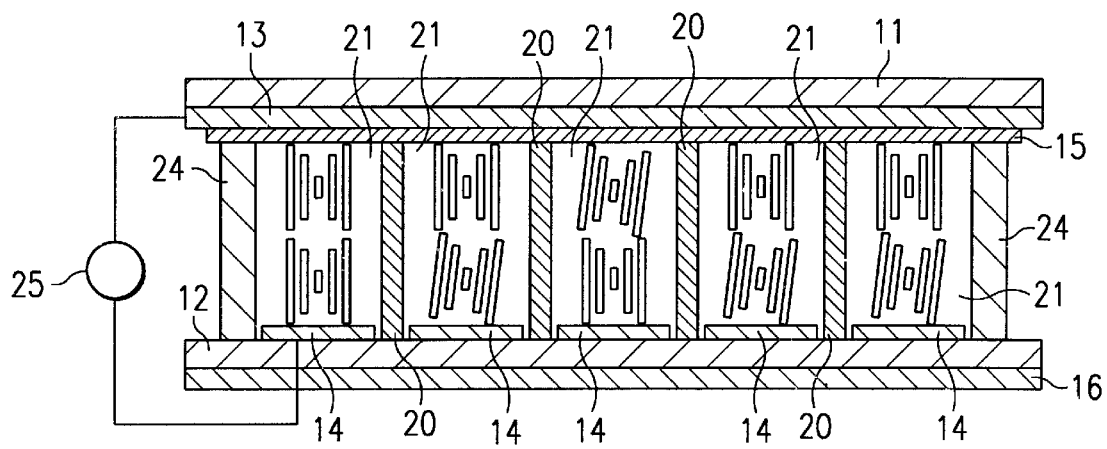
FIG. 1B is a cross-sectional view of a first embodiment of the liquid crystal display element of the present invention the focal conic state.

FIGS. 1A and 1B shows the construction of the liquid crystal display element of a first embodiment of the invention in cross-section. FIG. 1A illustrates the planar state (RGB color state) when a high voltage pulse is applied, and FIG. 1B illustrates the focal conic state (transparent/black display state) when a low voltage pulse is applied. This liquid crystal display element has a memory, and maintains the planar state or the focal conic state after a pulse voltage is applied.

In FIGS. 1A and 1B, matrix-like transparent electrodes 13 and 14 are formed on the surfaces of transparent substrates 11 and 12, respectively. It is desirable that the electrode 13 be coated with an insulating thin film 15. The reverse surface of the substrate 12 is provided with a visible light absorbing layer 16 in accordance with the requirements of the display.

Reference number 20 refers to a columnar structural member which functions as a spacer member and reference number 21 refers to a liquid crystal component, which manifests a cholesteric phase at room temperature. The combination of these materials is described below by way of specific experimental examples. Seal member 24 seals the liquid crystal component 21 between the substrates 11 and 12. Pulse power source 25 applies a predetermined pulse voltage to the electrodes 13 and 14.

In the liquid crystal display element having the previously described construction, display is accomplished by applying a pulse voltage from the power source 25 to the electrodes 13 and 14. That is, when the liquid crystal component manifests a cholesteric phase, the liquid crystal attains a planar state by the application of a relatively high pulse voltage, so as to selectively reflect light of predetermined wavelength based on the cholesteric pitch and refractive index. The liquid crystal attains a focal conic state so as to be transparent via the application of a relatively low pulse voltage. When a visible light absorbing layer 16 is provided, as shown in FIG. 1B, a black color can be displayed since the liquid crystal is in the focal conic state.

In the present liquid crystal display element, the region of intersection of the matrix-like transparent electrodes 13 and 14 comprises the display pixel.

In the present invention, the region for which light modulation is accomplished by the liquid crystal is referred to as the display region and the periphery thereof is outside the display region and is not light modulated.

At least one of the substrates 11 and 12 must be transparent. Other than glass, the transparent substrate may comprise a flexible substrate made of materials such as, but not limited to, polycarbonate, polyether sulfone, or polyethyleneterephthalate.

The electrodes 13 and 14 may be formed of a transparent conductive film typified by indium tin oxide (ITO), metal electrodes such as aluminum, silicon, and the like, or photoconductive film such as amorphous silicon, bismuth silicon oxide (BSO), and the like. The electrodes 13 and 14 may be formed as matrices, e.g., by forming an ITO layer on substrates 11 and 12 via a spattering method, and subsequently patterning the layer via photolithography.

The thin insulation layer 15 is an inorganic film such as silicon oxide or the like, or an organic layer such as polyimide resin, epoxy resin or the like. The thin insulation layer 15 functions to prevent a short circuit between the electrodes 13 and 14, and to improve the reliability of the liquid crystal as a gas barrier layer. An orientation layer, typically formed of polyimide resin, may be provided on the electrodes 13 and 14 as necessary. Material of the same high molecular component used in the columnar structural member 20 may be used as the insulating layer and orientation layer.

Figure 2:
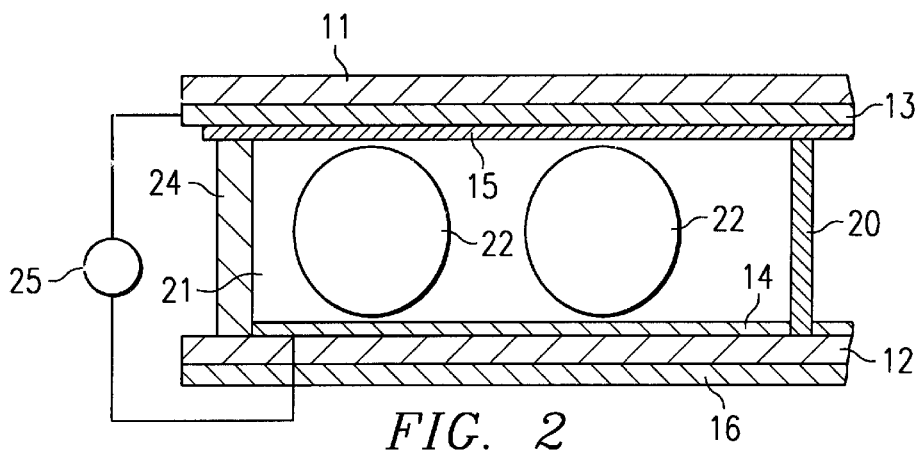
FIG. 2 is a partial cross-sectional view of a second embodiment of the liquid crystal display element of the present invention.

In a second embodiment, shown in FIG. 2, a spacer 22 may be inserted between the substrates 11 and 12. Such a spacer 22 can be spherical and formed of resin or inorganic oxide so as to maintain a uniform gap between the substrates 11 and 12. Furthermore, such a spherical spacer 22 alone may be used as a space-supporting member instead of the columnar structural member 20. The spacer 22 may also be disposed within the columnar structural member 20.

The liquid crystal component comprises a liquid crystal pyrimidine compound containing fluorine in the molecule, a liquid crystal diphenylacetylene compound containing fluorine in the molecule, and a chiral component added to attain 5 to 45 percent by weight (hereinafter abbreviated as "wt %"). Colorant may also be added. The liquid crystal component may also include a liquid crystal phenylcyclohexane compound, a liquid crystal cyanobiphenyl compound, and a liquid crystal alkenyl compound. This liquid crystal component is adjusted so as to attain a desired selective reflection wavelength.

The adjustment of the selective reflection wavelength may be accomplished by changing the added amount of chiral component. Generally, when the amount of added chiral component is increased, the selective reflection wavelength is shifted toward the short wavelength side. Furthermore, when a pulse voltage is applied to the electrodes 13 and 14 and the liquid crystal attains the planar state, the selective reflection wavelength is the peak wavelength in the visible light region of the reflected light spectrum.

Examples of usable liquid crystal pyrimidine compounds containing fluorine in the molecule will have the general structure of formula (A):

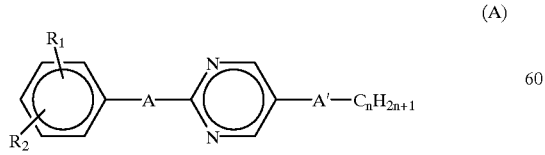

(A)

wherein A and A' represent a single bond or phenyl radical, excluding instances where both are simultaneously phenyl radicals; $R_1$ and $R_2$ represent hydrogen atoms or fluorine atoms, excluding instances where both are simultaneously hydrogen atoms; and n represents an integer from 2 through 10. Specific examples of such structural formulae are shown in formulas ($A_1$) through ($A_{38}$) below.

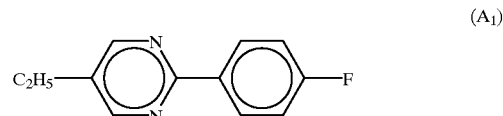

($A_1$)

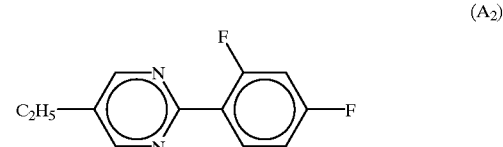

($A_2$)

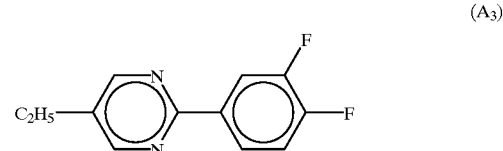

($A_3$)

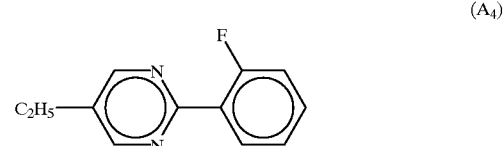

($A_4$)

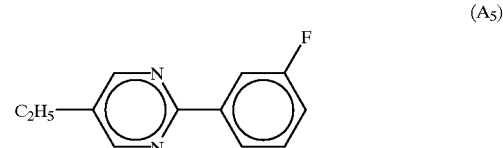

($A_5$)

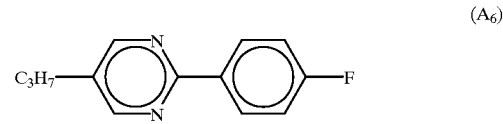

($A_6$)

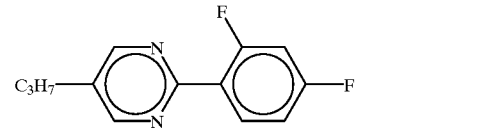

($A_7$)

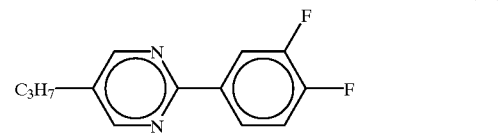

($A_8$)

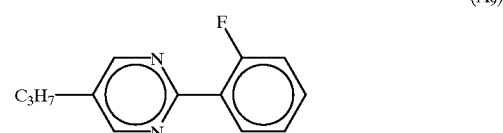

($A_9$)

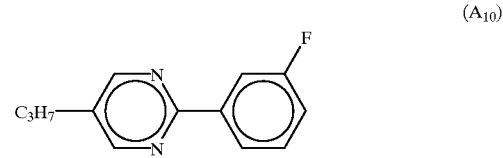

($A_{10}$)

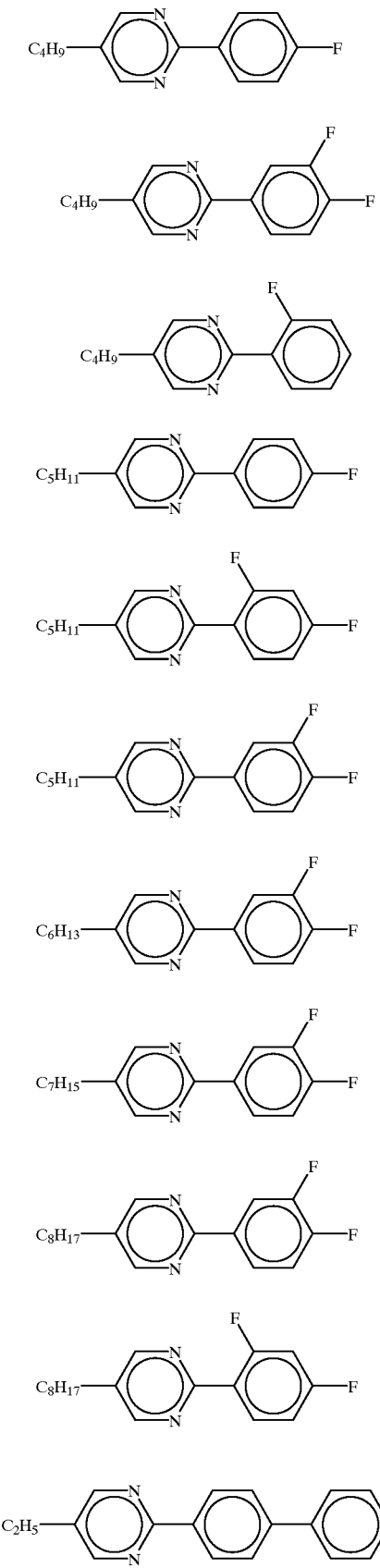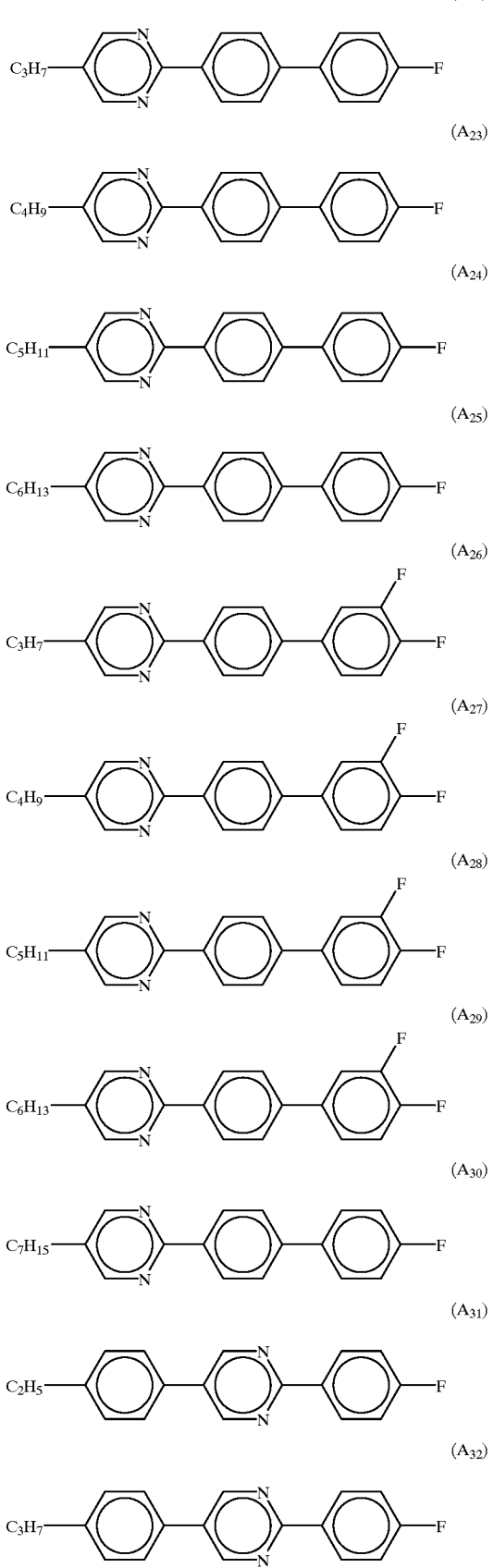

(A33) 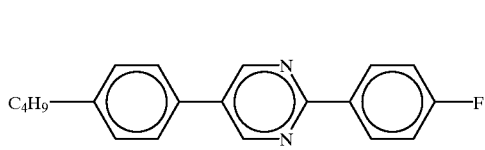

(A34) 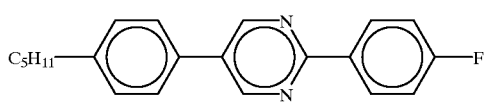

(A35) 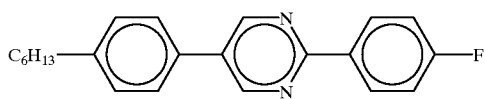

(A36) 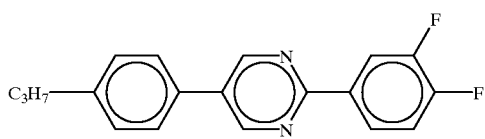

(A37) 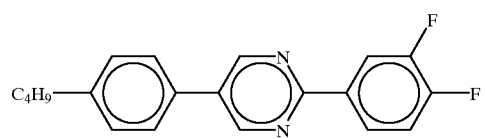

(A38) 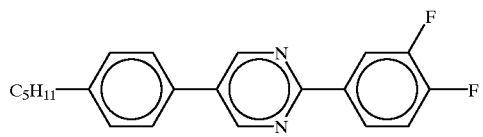

Examples of usable liquid crystal diphenylacetylene compounds containing fluorine in the molecule have the general structure of formula (B):

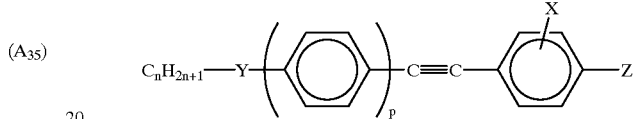

(B)

wherein X represents a fluorine atom or a hydrogen atom; Y represents a single bond or a cyclohexane ring; and Z represents a group having the following chemical structure, a fluorine atom, a fluoroalkyl group, or a hydrogen atom:

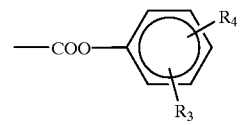

wherein $R_3$ and $R_4$ represent hydrogen atoms or fluorine atoms, excluding instances where both are simultaneously hydrogen atoms. Further, X and Z are not simultaneously hydrogen atoms; n represents an integer from 2 to 10; and P represents an integer of 1 or 2. Specific examples of such structural formulae are shown in formulas ($B_1$) through ($B_{45}$) below.

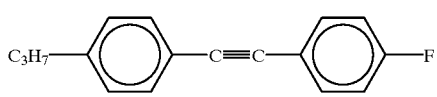

($B_1$)

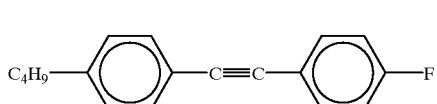

($B_2$)

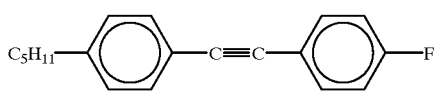

($B_3$)

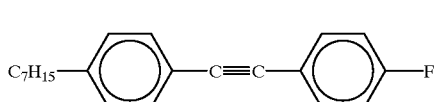

($B_4$)

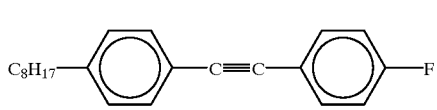

($B_5$)

-continued
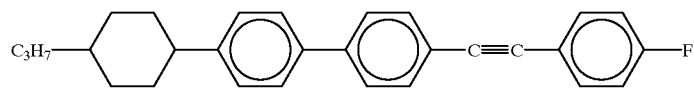
(B6)
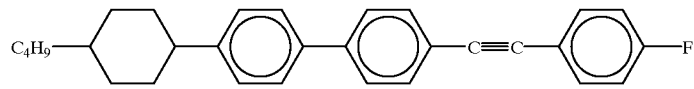
(B7)
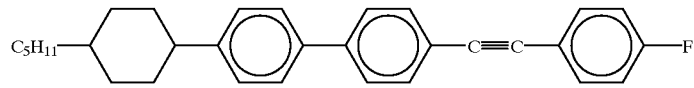
(B8)
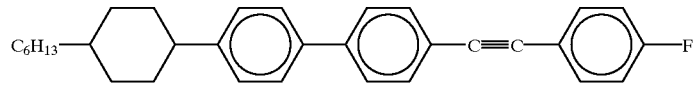
(B9)
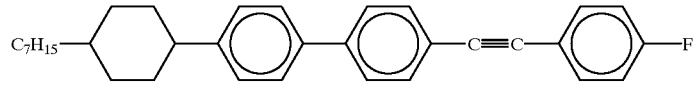
(B10)
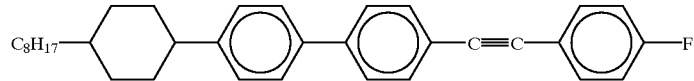
(B11)
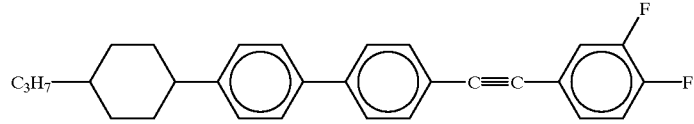
(B12)
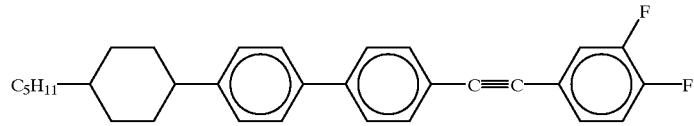
(B13)
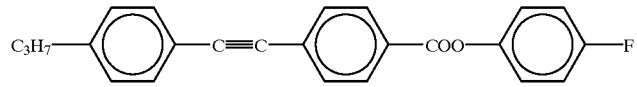
(B14)
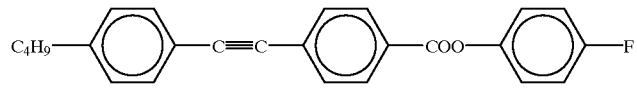
(B15)
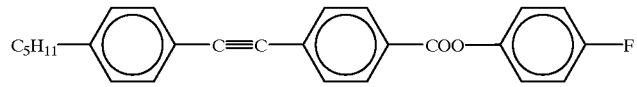
(B16)
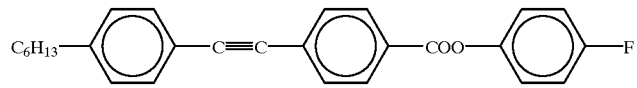
(B17)
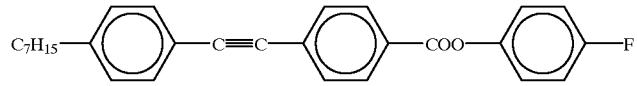
(B18)

(B19)
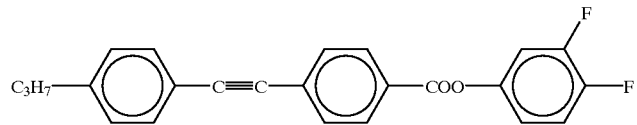
(B20)
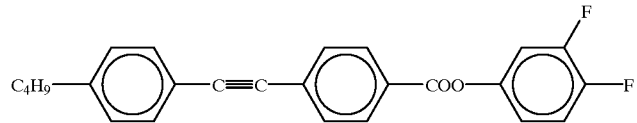
(B21)
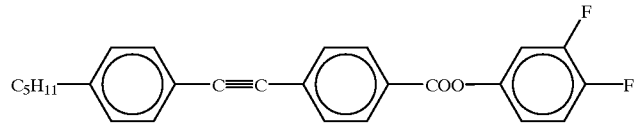
(B22)
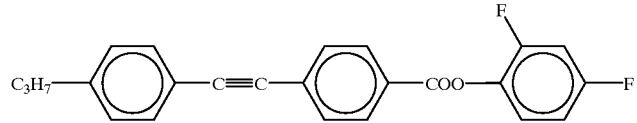
(B23)
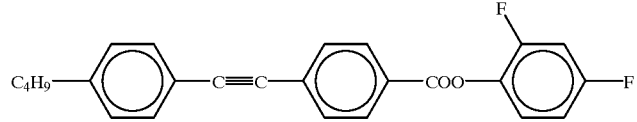
(B24)
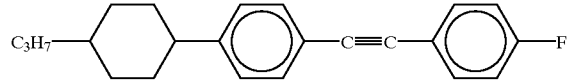
(B25)
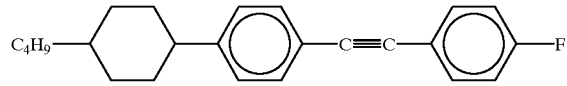
(B26)
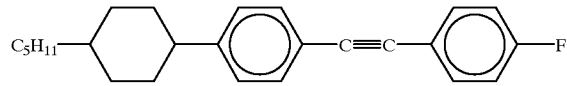
(B27)
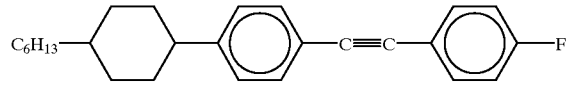
(B28)
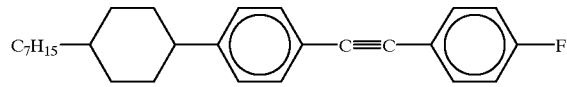
(B29)
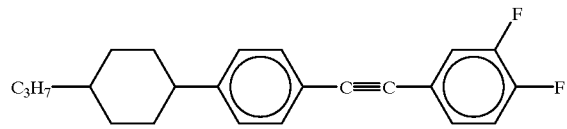

-continued
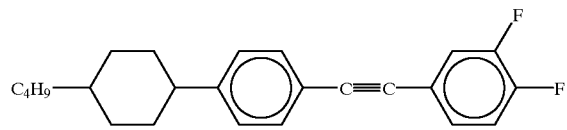
(B30)
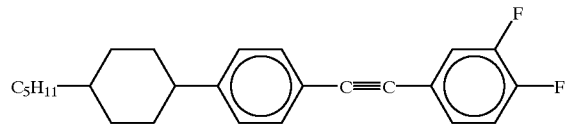
(B31)
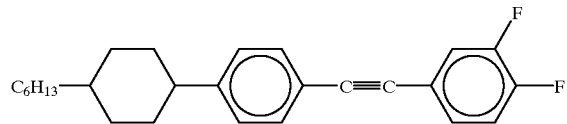
(B32)
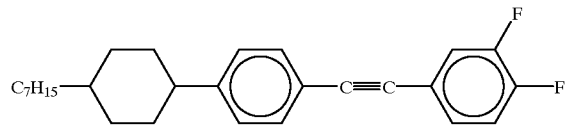
(B33)
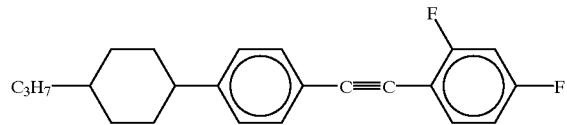
(B34)
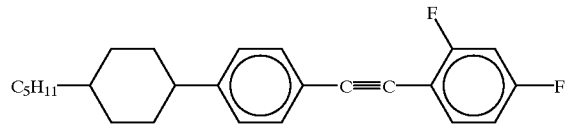
(B35)
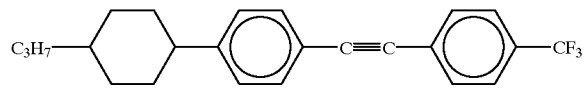
(B36)
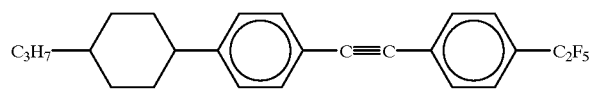
(B37)
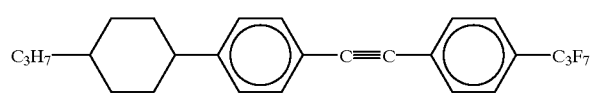
(B38)
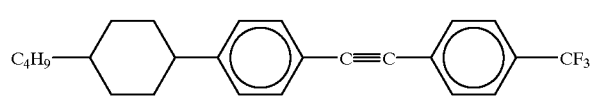
(B39)
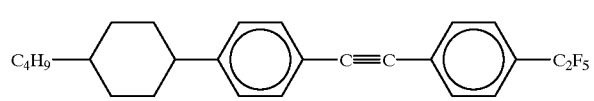
(B40)
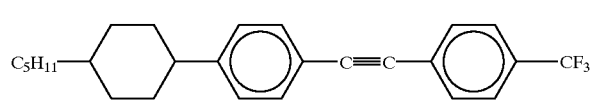
(B41)

-continued
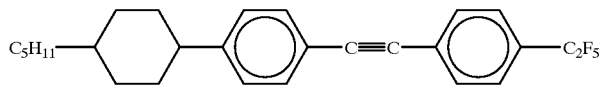
(B42)
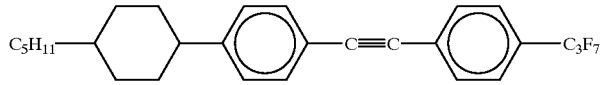
(B43)
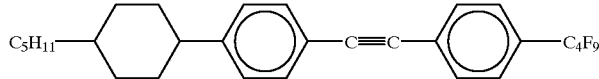
(B44)
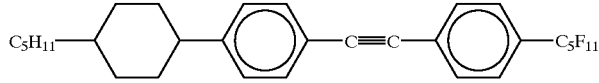
(B45)
Examples of usable chiral components include various types of well-known ester compounds, pyrimidine compounds, azoxy compounds, diphenylacetylene compounds and the like. It is particularly desirable to use compounds having the chemical structural formulae ($F_1$) through ($F_6$) shown below.
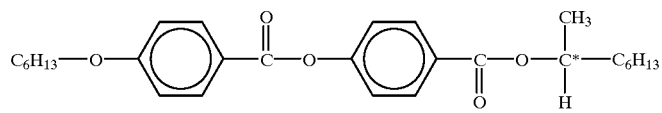
($F_1$)
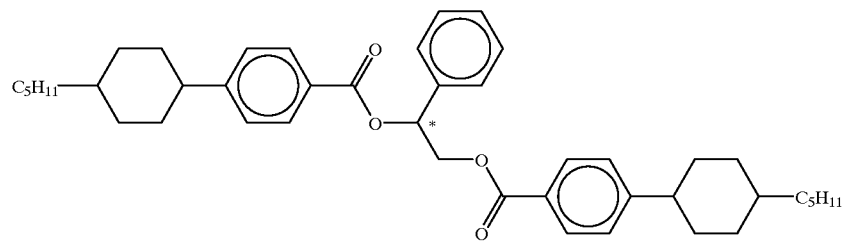
($F_2$)
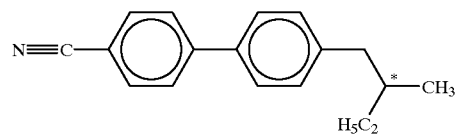
($F_3$)
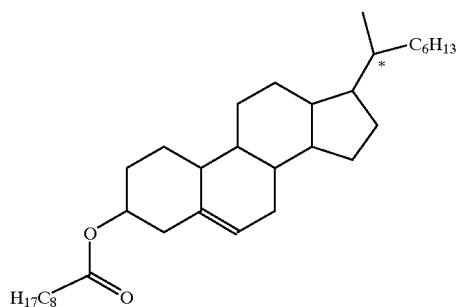
($F_4$)
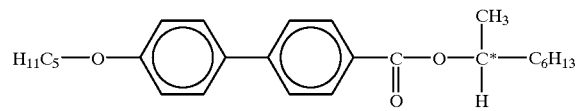
($F_5$)

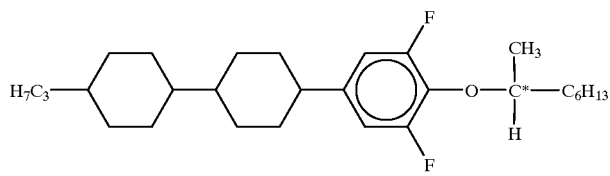

(F6)

The added amount of such compounds may be 5 to 45 wt % of the liquid crystal component. When the added amount is less than 5 wt %, the desired selective reflection wavelength cannot be produced, whereas when the added amount exceeds 45 wt %, the compound solidifies and cannot attain a cholesteric phase at room temperature.

Examples of well-known conventional colorant additives include azo compounds, quinone compounds, anthraquinone compounds, or dichroic colorants and the like. The amount of added colorant is preferably less than 3 wt % relative to the total amount of liquid crystal component and chiral component.

The columnar structural member 20, for example, may be cylindrical, quadrangular, or elliptical in shape and is preferably arranged at uniform intervals in a predetermined pattern, such as a lattice array. The columnar structural member 20 may also be a strip-like member disposed at a predetermined spacing. The columnar structural member 20 does not have a random arrangement, and preferably is arranged so as to maintain a suitable spacing between the substrates 11 and 12. For example, the spacing may be in the form of an equal-spaced array, an array having gradually changing spacing, or an array repeating a predetermined layout pattern with uniform periodicity, wherein the spacing does not impede the image display. The columnar structural member 20 provides sufficient strength for maintaining the display element in practical application if it occupies 1% to 40% of the display region.

The columnar structural member 20 is formed using a polymeric component comprising a polymerization initiator added to a polymerizable monomer. The polymeric component may be, for example, a commercial photo-setting resin material comprising a fluid mixture of a photo-setting monomer or oligamer and a photopolymerization initiator. When forming the columnar structural member by polymerization initiated by exposing the photo-setting resin material to light, the columnar structural member is readily arranged in a predetermined shape and spacing. Materials most suitable for forming the columnar structural member will have ester acrylate compounds as the main constituent. Ester acrylates include acrylate compounds having two or more acrylic groups and methacrylate compounds, and may contain the structure of aromatic rings and the like in the main chain between acrylic groups. They may additionally contain bivalent groups such as $CO$, $CO_2$, $CH_2$, $O$ and the like in the main chain. The acrylate compound may contain an epoxyacrylate compound, an urethaneacrylate compound, or the like.

The method of producing the columnar structural member 20 is described below. First, an ultraviolet curing compound (columnar structural component) is held between substrates on which is formed an ITO electrode and a mask formed with a predetermined pattern. Alternatively, an ultraviolet curing compound is applied on the electrode surface on the substrate using a mask, then the material is exposed to ultraviolet light. Next, the mask is peeled away, and the compound in the exposed area is washed with a predetermined solvent, dried, and hardened.

It is also possible to hold a mixture containing previously mixed liquid crystal material and a photo-setting resin material between glass substrates, place a photomask on the glass substrates, and expose the material to light so as to induce polymer phase separation and form the columnar structural member.

A liquid crystal component may be injected between substrates holding the columnar structural member via vacuum injection or the like.

Figure 3:
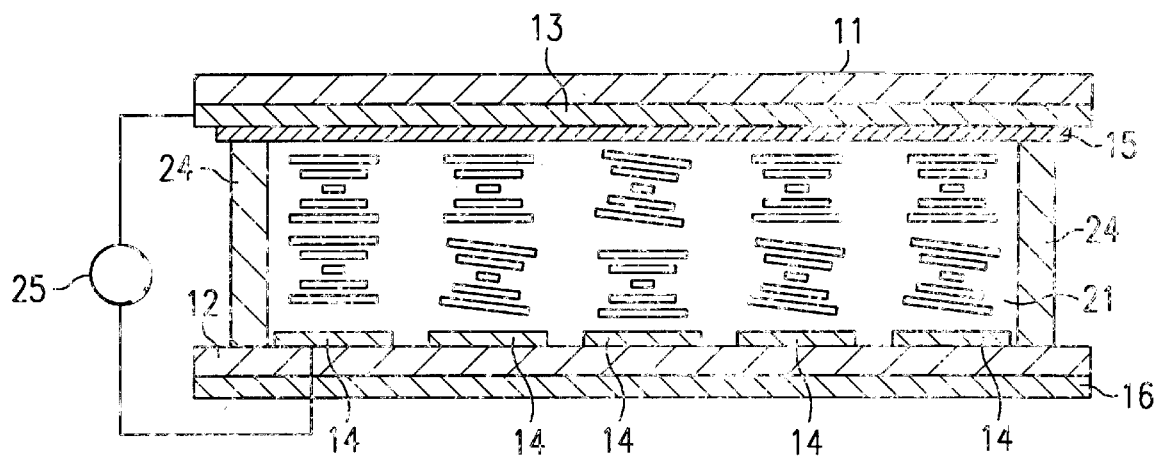
FIG. 3 is a cross-sectional view of a third embodiment of the liquid crystal display element of the present invention.

FIG. 3 shows the cross-sectional structure of a liquid crystal display element of a third embodiment of the present invention. In this embodiment, the liquid crystal material is in a planar state when a high voltage pulse is applied to the liquid crystal display element. This liquid crystal display element is substantially similar to the first embodiment shown in FIGS. 1A and 1B, with the exception that the columnar structural members are not provided within the display region. Like parts are designated by like reference numbers in the figures.

Figure 4:
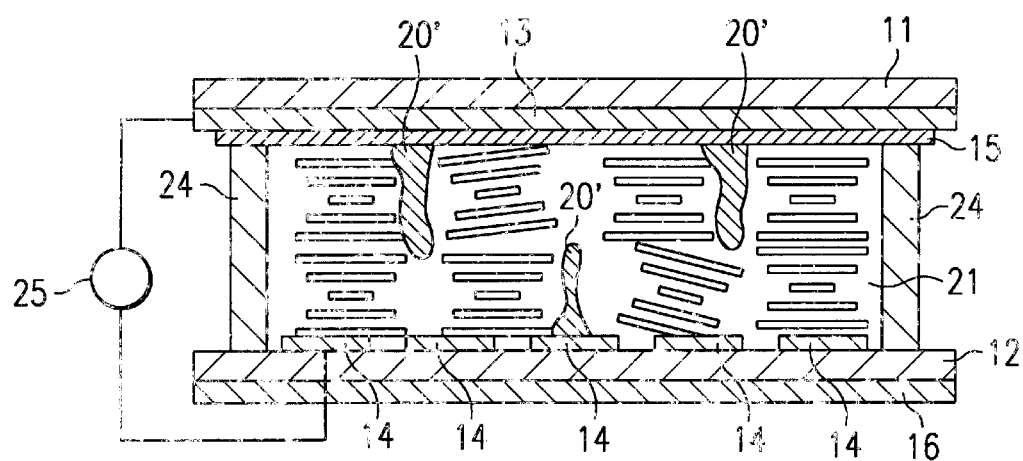
FIG. 4 is a cross-sectional view of a fourth embodiment of the liquid crystal display element of the present invention.

FIG. 4 shows the cross-sectional structure of a liquid crystal display element of a fourth embodiment of the present invention. In this embodiment, the liquid crystal material is also in a planar state when a high voltage pulse is applied. This liquid crystal display element is substantially similar to the third embodiment shown in FIG. 3, with the exception that the small columnar structural members 20' extend to the center area between the substrates 11 and 12. Like parts are designated by like reference numbers in FIGS. 2 and 3.

The fifth embodiment provides, to the liquid crystal display element of FIGS. 1A and 1B, a columnar structural member 20 formed by a silk-screening method. The silk-screening method applies a screen, formed to a predetermined pattern, onto the electrode surface of a substrate, and applies a printing material (columnar structural member) onto this screen. A squeegee is moved over the screen at a predetermined pressure, angle, and speed. In this way, the material is transferred onto the substrate through the screen pattern. Then, the transferred material is thermally set and dried.

When the columnar structural member is formed by a silk-screening method, the resin material is not limited to photo-setting resins, and thermoplastic resins and thermosetting resins, such as epoxy resins and acrylic resins, may be used. Examples of useful thermoplastic resins include polyvinylchloride resin, vinylidene polychloride resin, polyvinylacetate resin, polymethacrylate ester resin, polyacrylate ester resin, polystyrene resin, polyamide resin, polyethylene resin, polypropylene resin, fluororesin, polyurethane resin, polyacrylonotrile resin, polyvinyl ether resin, polyvinyl ketone resin, polyether resin, polyvinylpyrrolidone resin, saturated polyester resin, polycarbonate resin, polyetherchloride resin and the like. It is desirable that the resin material be used as a paste by dissolving the resin in a suitable solvent.

After the resin material is arranged on the substrate, a spacer is dispersed on at least one of the substrates, and the pair of substrates are overlaid one upon another with the surfaces having a plurality of band-like electrodes facing one another so as to form air cells therebetween. After the resin material is softened by heating under pressure from both sides of the overlaid pair of substrates, the resin is cooled and hardened.

EXAMPLE 1

A chiral nematic liquid crystal component, having a selective reflection wavelength of 550 nanometers (nm), was produced by mixing a nematic liquid crystal compound, comprising 49 wt % liquid crystal pyrimidine compound as represented by at least one of the aforesaid chemical structural formulae ($A_8$), ($A_{12}$), ($A_{18}$), ($A_{22}$), ($A_{23}$), ($A_{24}$) and at least one of the chemical structural formulae ($A_{51}$), ($A_{52}$), ($A_{53}$) below, and 30 wt % liquid crystal diphenyl acetylene compound, as represented by at least one of the aforesaid chemical structural formulae ($B_3$) and ($B_{26}$) and at least one of the chemical structural formulae ($B_{51}$) and ($B_{52}$) below, with 16.5 wt % chiral material represented by the chemical structural formula ($F_3$) and 8.5 wt % chiral material represented by the aforesaid chemical structural formula ($F_2$). This liquid crystal component had an anisotropic refractive index $\Delta n$ of 0.230, an anisotropic dielectric constant $\Delta \in$ of 12.6, and an isotropic phase transition temperature $T_{NI}$ of 89.7° C.

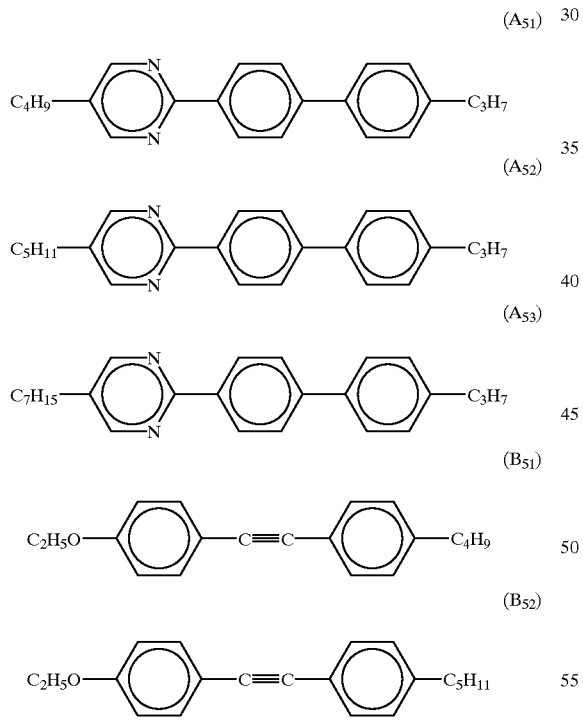

The spacing between the glass substrates on which electrodes were formed was adjusted to 7 μm by placement of a spacer, thereby holding the liquid crystal component therebetween. A black light absorbing layer was provided on the opposite side of the substrate from the side through which light enters, to produce the liquid crystal display element having the structure shown in FIG. 3.

When a pulse voltage of 60 V was applied for 5 msec between the electrodes, the liquid crystal display element manifested a focal conic state (transparent state), with a Y value (visible reflectivity) of 1.74.

When a pulse voltage of 100 V was applied for 5 msec, the liquid crystal element manifested a planar state (green color state), with a Y value of 22.26. The contrast was 12.8, the color purity was 68.2%, and the reflectivity was 39.8%.

The Y value and color purity (excitation purity) were measured using the spectroscopic calorimeter model CM-3700d (Minolta Co., Ltd.) provided with a white light source. Procedures and equipment were identical in the examples and reference examples that follow.

EXAMPLE 2

A chiral nematic liquid crystal component, having a selective reflection wavelength of 480 nm, was produced by mixing a nematic liquid crystal compound, comprising 49 wt % liquid crystal pyrimidine compound, as represented by at least one of the aforesaid chemical structural formulae ($A_8$), ($A_{18}$), ($A_{22}$), ($A_{23}$), ($A_{24}$), ($A_{51}$), ($A_{52}$), and ($A_{53}$), and 35 wt % liquid crystal diphenyl acetylene compound, as represented by at least one of the aforesaid chemical structural formulae ($B_3$) ($B_{26}$), ($B_{51}$), and ($B_{52}$), with 18.8 wt % chiral material, as represented by the chemical structural formula ($F_6$), and 7.1 wt % chiral material, as represented by the aforesaid chemical structural formula ($F_2$). This liquid crystal component had an anisotropic refractive index $\Delta n$ of 0.215, anisotropic dielectric constant $\Delta \in$ of 10.8, and isotropic phase transition temperature $T_{NI}$ of 86.5° C.

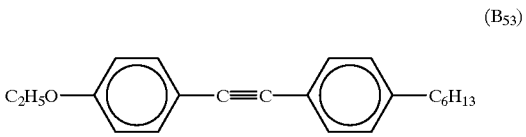

The spacing between the glass substrates, on which electrodes were formed, was adjusted to 7 μm by placement of a spacer, thereby holding the liquid crystal component therebetween. A black light absorbing layer was provided on the opposite side of the substrate from the side through which light enters, to produce the liquid crystal display element having the structure shown in FIG. 3.

When a pulse voltage of 70 V was applied for 5 msec between the electrodes, the liquid crystal display element manifested a focal conic state (transparent state), with a Y value of 1.61. When a pulse voltage of 100 V was applied for 5 msec, the liquid crystal element manifested a planar state (blue color state), with a Y value of 8.68. The contrast was 5.39, color purity was 71.0%, and the reflectivity was 40.2%.

EXAMPLE 3

A chiral nematic liquid crystal component, having a selective reflection wavelength of 695 nm, was produced by mixing a nematic liquid crystal compound, comprising 49 wt % liquid crystal pyrimidine compound, as represented by at least one of the aforesaid chemical structural formulae ($A_7$), ($A_{14}$), ($A_{17}$), ($A_{26}$), ($A_{27}$), ($A_{28}$), ($A_{38}$), ($A_{52}$), and ($A_{53}$), and 35 wt % liquid crystal diphenyl acetylene compound, as represented by at least one of the aforesaid chemical structural formulae ($B_3$), ($B_{10}$) ($B_{26}$), ($B_{31}$), ($B_{51}$), and ($B_{52}$), with 17.66 wt % chiral material, as represented by the chemical structural formula ($F_4$), and 6.92 wt % chiral material, as represented by the aforesaid chemical structural formula ($F_2$), then adding 0.5 wt % dichroic colorant SI-426

(manufactured by Mitsui Toatsu Chemicals, Inc.). This liquid crystal component had an anisotropic refractive index $\Delta n$ of 0.208, anisotropic dielectric constant $\Delta\varepsilon$ of 11.4, and isotropic phase transition temperature $T_{NI}$ of 84.3° C.

The spacing between the glass substrates, on which electrodes were formed, was adjusted to 7 μm by placement of a spacer, thereby holding the liquid crystal component therebetween. A black light absorbing layer was provided on the opposite side of the substrate from the side through which light enters, to produce the liquid crystal display element having the structure shown in FIG. 3.

When a pulse voltage of 60 V was applied for 5 msec between the electrodes, the liquid crystal display element manifested a focal conic state (transparent state), with a Y value of 0.93. When a pulse voltage of 90 V was applied for 5 msec, the liquid crystal element manifested a planar state (blue color state), with a Y value of 4.35. The contrast was 4.67, color purity was 75.0%, and the reflectivity was 34.6%.

EXAMPLE 4

A chiral nematic liquid crystal component, having a selective reflection wavelength of 690 nm, was produced by mixing a nematic liquid crystal compound comprising 27 wt % liquid crystal pyrimidine compound, as represented by at least one of the aforesaid chemical structural formulae ($A_{22}$), ($A_{23}$), and ($A_{24}$), and 35 wt % liquid crystal diphenyl acetylene compound, as represented by at least one of the aforesaid chemical structural formulae ($B_3$) ($B_4$), ($B_{16}$), and ($B_{31}$), and 27 wt % liquid crystal alkenyl compound, as represented by at least one of the chemical structural formulae ($E_1$), ($E_2$), ($E_3$) below, with 17.20 wt % chiral material, as represented by the chemical structural formula ($F_4$), and 7.83 wt % chiral material, as represented by the aforesaid chemical structural formula ($F_2$), then adding 0.5 wt % dichroic colorant SI-426 (Mitsui Toatsu Chemicals, Inc.). This liquid crystal component had an anisotropic refractive index $\Delta n$ of 0.222, anisotropic dielectric constant $\Delta\varepsilon$ of 10.2, and isotropic phase transition temperature $T_{NI}$ of 81.8° C.

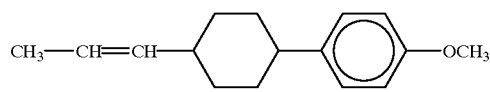

($E_1$)

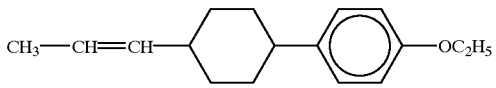

($E_2$)

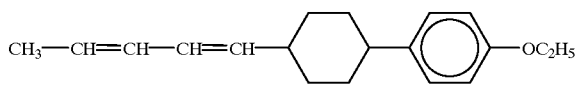

($E_3$)

The spacing between the glass substrates, on which electrodes were formed, was adjusted to 7 μm by placement of a spacer, thereby holding the liquid crystal component therebetween. A black light absorbing layer was provided on the opposite side of the substrate from the side through which light enters, to produce the liquid crystal display element having the structure shown in FIG. 3.

When a pulse voltage of 60 V was applied for 5 msec between the electrodes, this liquid crystal display element manifested a focal conic state (transparent state), with a Y value of 0.62. When a pulse voltage of 90 V was applied for 5 msec, this liquid crystal element manifested a planar state (red color state), with a Y value of 3.49. The contrast was 5.63, color purity was 68.0%, and the reflectivity was 35.6%.

EXAMPLE 5

A chiral nematic liquid crystal component, having a selective reflection wavelength of 690 nm, was produced by mixing a nematic liquid crystal compound comprising 49 wt % liquid crystal pyrimidine compound, as represented by at least one of the aforesaid chemical structural formulae ($A_8$), ($A_{12}$), ($A_{18}$), ($A_{26}$), ($A_{27}$), ($A_{28}$), and ($A_{52}$), and 35 wt % liquid crystal diphenyl acetylene compound, as represented by at least one of the aforesaid chemical structural formulae ($B_3$) ($B_{10}$), ($B_{26}$), ($B_{31}$), ($B_{51}$), and ($B_{52}$), and 5 wt % liquid crystal cyanobiphenyl compound, as represented by at least one of the structural chemical formulae ($D_1$), ($D_2$), and ($D_3$) below, with 17.53 wt % chiral material, as represented by the chemical structural formula ($F_4$), and 7.87 wt % chiral material, as represented by the aforesaid chemical structural formula ($F_2$). This liquid crystal component had an anisotropic refractive index $\Delta n$ of 0.198, anisotropic dielectric constant $\Delta\varepsilon$ of 13.0, and isotropic phase transition temperature $T_{NI}$ of 87.5° C.

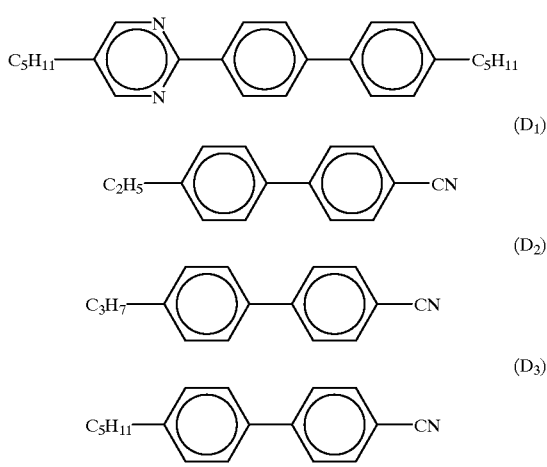

The spacing between the glass substrates, on which electrodes were formed, was adjusted to 7 μm by placement of a spacer, thereby holding the liquid crystal component therebetween. A black light absorbing layer was provided on the opposite side of the substrate from the side through which light enters, as shown in FIG. 2, and a color filter was provided on the side of the substrate through which light enters to produce the liquid crystal display element.

When a pulse voltage of 50 V was applied for 5 msec between the electrodes, this liquid crystal display element manifested a focal conic state (transparent state), with a Y value of 0.75. When a pulse voltage of 100 V was applied for 5 msec, this liquid crystal element manifested a planar state (red color state), with a Y value of 3.48. The contrast was 4.64, color purity was 79.0%, and the reflectivity was 34.8%.

EXAMPLE 6

A chiral nematic liquid crystal component, having a selective reflection wavelength of 690 nm, was produced by mixing a nematic liquid crystal compound comprising 27 wt % liquid crystal pyrimidine compound, as represented by at least one of the aforesaid chemical structural formulae ($A_8$), ($A_{12}$) ($A_{16}$) ($A_{18}$), ($A_{30}$), ($A_{38}$), ($A_{52}$), and ($A_{54}$), and 44.6 wt % liquid crystal diphenyl acetylene compound, as represented by at least one of the aforesaid chemical structural formulae ($B_{13}$) ($B_{16}$), ($B_{18}$), ($B_{21}$), ($B_{31}$), ($B_{51}$), and at least one of the structural formulae ($B_{54}$), ($B_{55}$), and ($B_{56}$), and 24 wt % liquid crystal phenylcyclohexane compound, as represented by at least one of the chemical structural formulae ($C_1$) and ($C_2$) below, with 13.5 wt % chiral material, as represented by the chemical structural formula ($F_4$), and 11.9 wt % chiral material, as represented by the aforesaid chemical structural formula ($F_1$). This liquid crystal component had an anisotropic refractive index $\Delta n$ of 0.217, anisotropic dielectric constant $\Delta\in$ of 7.7, and isotropic phase transition temperature $T_{NI}$ of 121.7° C.

sented by at least one of the aforesaid chemical structural formulae ($B_{24}$) ($B_{26}$), ($B_{28}$), and ($B_{54}$) and at least one of the structural formulae ($B_{57}$), ($B_{58}$), ($B_{59}$), ($B_{60}$), and ($B_{61}$) below, and 50 wt % liquid crystal phenylcyclohexane compound, as represented by at least one of the aforesaid chemical structural formulae ($C_1$) and the structural formulae ($C_3$) and ($C_4$) below, but not including liquid crystal pyrimidine compound, and with 18 wt % chiral material, as represented by the chemical structural formula ($F_3$), and 3.97 wt % chiral material, as represented by the aforesaid chemical structural formula ($F_2$). This liquid crystal component had an anisotropic refractive index $\Delta n$ of 0.202, anisotropic dielectric constant $\Delta\in$ of 7.2, and isotropic phase transition temperature $T_{NI}$ of 95° C.

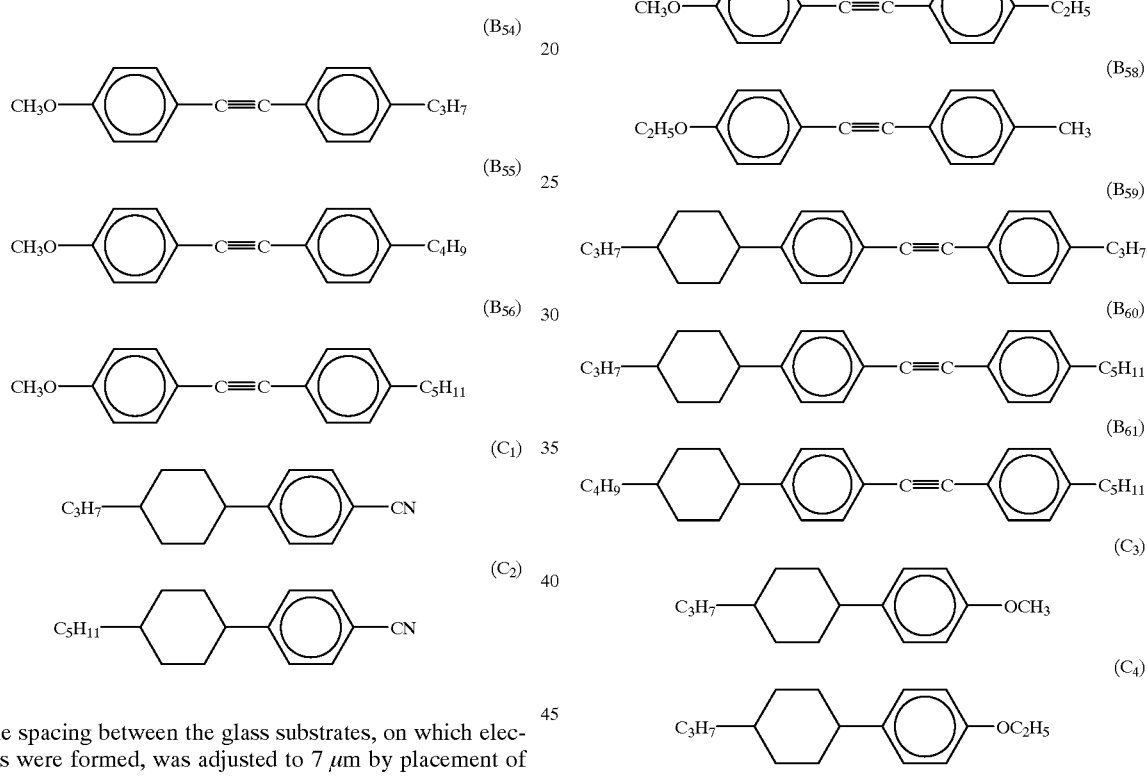

The spacing between the glass substrates, on which electrodes were formed, was adjusted to 7 $\mu$m by placement of a spacer, thereby holding the liquid crystal component therebetween. A black light absorbing layer was provided on the opposite side of the substrate from the side through which light enters, as shown in FIG. 3, and a color filter was provided on the side of the substrate through which light enters to produce the liquid crystal display element.

When a pulse voltage of 60 V was applied for 5 msec between the electrodes, this liquid crystal display element manifested a focal conic state (transparent state), with a Y value of 0.67. When a pulse voltage of 100 V was applied for 5 msec, this liquid crystal element manifested a planar state (red color state), with a Y value of 3.5. The contrast was 5.22, color purity was 74.0%, and the reflectivity was 35.8%.

Reference Example 1

A chiral nematic liquid crystal component, having a selective reflection wavelength of 550 nm, was produced by mixing a nematic liquid crystal compound comprising 39 wt % liquid crystal diphenyl acetylene compound, as repre- The spacing between the glass substrates, on which electrodes were formed, was adjusted to 7 $\mu$m by placement of a spacer, thereby holding the liquid crystal component therebetween. A black light absorbing layer was provided on the opposite side of the substrate from the side through which light enters, to produce the liquid crystal display element having the structure shown in FIG. 3.

When a pulse voltage of 80 V was applied for 5 msec between the electrodes, this liquid crystal display element manifested a focal conic state (transparent state), with a Y value of 2.84. When a pulse voltage of 130 V was applied for 5 msec, this liquid crystal element manifested a planar state (green color state), with a Y value of 21.9. The contrast was 7.77, color purity was 56.6%, and the reflectivity was 34.2%.

Reference Example 2

A chiral nematic liquid crystal component, having a selective reflection wavelength of 680 nm, was produced by mixing a nematic liquid crystal compound comprising 48 wt % liquid crystal pyrimidine compound, as represented by at least one of the aforesaid chemical structural formulae ($A_{22}$) and ($A_{23}$), and the structural formulae ($A_{55}$) and ($A_{56}$) below, and 34 wt % liquid crystal cyanobiphenyl compound, as represented by at least one of the aforesaid structural formulae ($D_1$), ($D_2$) and ($D_3$), but not containing liquid crystal diphenyl acetylene compound nor liquid crystal phenylcyclohexane compound, with 21.1 wt % chiral material, as represented by the chemical structural formula ($F_4$), and 2.3 wt % chiral material, as represented by the aforesaid chemical structural formula ($F_2$), and with 0.5 wt % dichroic colorant SI-426 (manufactured by Mitsui Toatsu Chemicals, Inc.). This liquid crystal component had an anisotropic refractive index $\Delta n$ of 0.201, anisotropic dielectric constant $\Delta \in$ of 20.9, and isotropic phase transition temperature $T_{NI}$ of 78.4° C.

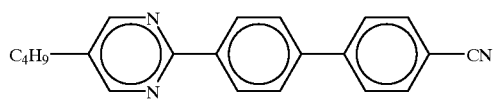
($A_{55}$)

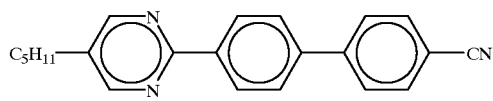
($A_{56}$)

The spacing between the glass substrates, on which electrodes were formed, was adjusted to 7 μm by placement of a spacer, thereby holding the liquid crystal component therebetween. A black light absorbing layer was provided on the opposite side of the substrate from the side through which light enters to produce the liquid crystal display element shown in FIG. 3.

When a pulse voltage of 60 V was applied for 5 msec between the electrodes, this liquid crystal display element manifested a focal conic state (transparent state), with a Y value of 2.2. When a pulse voltage of 110 V was applied for 5 msec, this liquid crystal element manifested a planar state (red color state), with a Y value of 4.54. The contrast was 2.06, color purity was 56.0%, and the reflectivity was 31.5%.

While preferred embodiments of the present invention has been described with respect to certain preferred embodiments, it should be apparent to those skilled in the art that it is not so limited. Various other modifications may be made without departing from the spirit and scope of the invention. It is intended that the following claims be interpreted to embrace all such variations and modifications.

What is claimed is:

1. A liquid crystal display element comprising:
   a liquid crystal component which exhibits a cholesteric phase at room temperature;
   a first substrate and a second substrate, said first substrate having a first side facing a second side of said second substrate, wherein at least one of said first substrate and said second substrate is transparent; and
   a structural member disposed between said first substrate and said second substrate and attached to said first side and said second side for spacing apart said first substrate and said second substrate,
   wherein the liquid crystal component comprises a chiral-nematic liquid crystal material having a liquid crystal pyrimidine compound containing fluorine, a liquid crystal diphenylacetylene compound containing fluorine, and at least one chiral component.

2. A liquid crystal display element as claimed in claim 1, wherein the liquid crystal component comprises a plurality of chiral components.

3. A liquid crystal display element as claimed in claim 1, wherein the liquid crystal component further comprises a liquid crystal phenylcyclohexane compound.

4. A liquid crystal display element as claimed in claim 3, wherein the liquid crystal component comprises a plurality of chiral components.

5. A liquid crystal display element as claimed in claim 1, wherein the liquid crystal component further comprises a liquid crystal cyanobiphenyl compound.

6. A liquid crystal display element as claimed in claim 5, wherein the liquid crystal component comprises a plurality of chiral components.

7. A liquid crystal display element as claimed in claim 1, wherein the liquid crystal component further comprises a liquid crystal alkenyl compound.

8. A liquid crystal component which exhibits a cholesteric phase at room temperature, said liquid crystal component comprising:
   a liquid crystal pyrimidine compound containing fluorine;
   a liquid crystal diphenylacetylene compound containing fluorine; and
   at least one chiral component.

9. A liquid crystal component, as claimed in claim 8, wherein the liquid crystal component comprises a plurality of chiral components.

10. A liquid crystal component, as claimed in claim 8, further comprising a liquid crystal phenylcyclohexane compound.

11. A liquid crystal component, as claimed in claim 10, wherein the liquid crystal component comprises a plurality of chiral components.

12. A liquid crystal component, as claimed in claim 8, further comprising a liquid crystal cyanobiphenyl compound.

13. A liquid crystal component, as claimed in claim 12, wherein the liquid crystal component comprises a plurality of chiral components.

14. A liquid crystal component, as claimed in claim 8, further comprising a liquid crystal alkenyl compound.

15. A method for making a liquid crystal component which exhibits a cholesteric phase at room temperature, said method comprising the steps of:
   (a) providing a liquid crystal pyrimidine compound which contains fluorine;
   (b) providing a liquid crystal diphenylacetylene compound which contains fluorine;
   (c) providing at least one chiral component; and
   (d) mixing the liquid crystal pyrimidine compound, the liquid crystal diphenylacetylene compound, and the at least one chiral component.

* * * * *